United States Patent [19]

Ernst

[11] Patent Number: 4,782,229
[45] Date of Patent: Nov. 1, 1988

[54] PHOTOELECTRIC DISPLACEMENT MEASURING DEVICE FOR OBTAINING HARMONIC FREE SIGNALS

[75] Inventor: Alfons Ernst, Traunreut, Fed. Rep. of Germany

[73] Assignee: Dr. Johannes Heidenhain GmbH, Traunreut, Fed. Rep. of Germany

[21] Appl. No.: 47,764

[22] Filed: May 8, 1987

[30] Foreign Application Priority Data

May 14, 1986 [DE] Fed. Rep. of Germany ....... 3616144

[51] Int. Cl.[4] ............................ H01J 3/14; H01J 5/16
[52] U.S. Cl. ........................... 250/237 G; 250/231 SE
[58] Field of Search ................... 250/231 SE, 237 G; 340/347 P; 356/395; 33/125 C

[56] References Cited

U.S. PATENT DOCUMENTS

| 2,886,717 | 5/1959 | Williamson et al. | 356/373 |
| 3,951,548 | 4/1976 | Westell | 250/237 G |
| 3,961,318 | 6/1976 | Farrand et al. | 340/870.37 |
| 4,430,566 | 2/1984 | Searle | 250/231 SE |
| 4,595,991 | 6/1986 | Spies | 364/525 |
| 4,602,436 | 7/1986 | Ernst | 33/125 C |

Primary Examiner—David C. Nelms
Assistant Examiner—William L. Oen
Attorney, Agent, or Firm—Willian Brinks Olds Hofer Gilson & Lione Ltd.

[57] ABSTRACT

A photoelectric measuring system for detecting an oscillation pattern produced by a light measuring apparatus and generating harmonic free electrical output signals up to a predetermined band width. Any number of harmonics may be eliminated by selecting the size, shape, and position of a plurality of photoelements with respect to the oscillation pattern detected.

8 Claims, 4 Drawing Sheets

PHOTOELECTRIC DISPLACEMENT MEASURING DEVICE FOR OBTAINING HARMONIC FREE SIGNALS

BACKGROUND OF THE INVENTION

The present invention relates to a photo electric measuring system for detecting relative movements of two components in a Moire strip system.

It is known that electrical signals produced from measuring the relative positions of two optical grids contain harmonics. For example, German unexamined patent specification DE-OS No. 2500798 discloses a Moire stripe detector containing four partial fields. The partial fields are arranged such that straight lines which pass through the surface centers of gravity of the respective partial fields run parallel to the Moire stripes as well as parallel to each other. According to one of the examples, a better harmonic filtering is achieved than in the other examples.

Currently, in order to eliminate harmonic components from an electrical output signal, very expensive apparatus is required. For example, additional components such as shaped diaphragms are to be avoided. (See German Pat. Nos. 1,673,988 and 1,941,731.) In addition, the measuring arrangements must be insensitive to inaccuracies in the graduations employed.

It is therefore an object of the present invention to provide a photoelectric measuring system which eliminates harmonic components from an electric signal produced by an optical measuring system. It is further an object of the present invention to provide a photoelectric measuring system which will inexpensively eliminate harmonic signals generated while measuring Moire stripes. Other objects of the present invention will be apparent to those skilled in the art in view of the specification and claims.

SUMMARY OF THE INVENTION

In accordance with the present invention, there is provided a photoelectric measuring system which produces a harmonic free signal up to a predetermined band width without the need for special optical elements. The harmonic free signals are produced by scanning a measuring scale which comprises a periodic graduation with a scanning unit adapted to scan the measuring scale. The periods of the measuring scale and scanning unit graduations sufficiently differ in a scanning direction such that a Moire oscillation pattern is produced possessing a period length which is greater than the respective graduation periods of the measuring scale and scanning unit. The Moire oscillation pattern is detected by a photoelectric measuring system which comprises a plurality of photoelements each defining a plurality of photosensitive partial fields selected such that their respective size and shape as well as their relative position to the Moire oscillation pattern eliminate harmonics of a predetermined band width from an electric output signal generated by the photoelectric system.

DETAILED DESCRIPTION OF THE DRAWINGS AND PREFERRED EMBODIMENTS

By precisely selecting the size and shape of the detector partial fields of the photoelectric system and positioning the fields with respect to the Moire oscillation pattern, any desired number of harmonics can be eliminated from the output signal without the need of additional expensive apparatus. Furthermore, a photoelectric measurement system comprising a plurality of pratial fields having preselected sizes, shapes, and positions, substantially reduces harmonic interference resulting from inaccuracies in graduation errors in the measuring and scanning scales.

Figure 1:
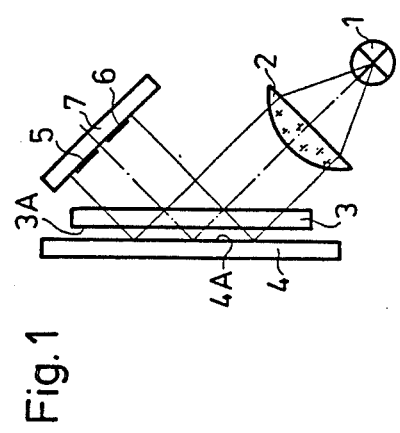
FIG. 1 is a schematic representation of a direct light measuring apparatus.

With respect to the drawings and preferred embodiments of the present invention, FIG. 1 shows a simple optical measuring arrangement. A light source 1 generates in cooperation with condensor 2 parallel light which passes through a scanning plate 3 which carries on one side a scanning graduation 3A. The scanning plate 3 may be constructed of any optically suitable transparent material such as glass. A measuring scale 4 which is relatively positioned opposite to the scanning plate 3 carries on the side facing the scanning graduation 3A an incremental graduation 4A of the graduation period P. When illuminated, the light source 1 generates parallel light which passes through scanning plate 3 and impinges on a measuring scale 4. The light is reflected from measuring scale 4, passes through the scanning graduation 3A, and strikes photoelements which are arranged in two series 5 and 6 on a carrier plate 7. The period P' of the scanning graduation 3A is different from the period P of the scale graduation 4A. The relationship between P and P' may be expressed in the following equation:

$$P/P' = 1 - k,$$

where $k << 1$.

As light passes through scanning graduation 3A and scale graduation 4A, a longitudinal Moire pattern having a period M is produced. The relationship between the Moire period M and the graduation period P is given in the following equation $$M = P/k$$

For example, assume $k = 0.1$ and that the period P of the scale graduation is 0.1 mm. Applying the above equation, the Moire period M is calculated as $P/k = 0.1$ mm/$0.1$ = 1 mm.

Figure 2:
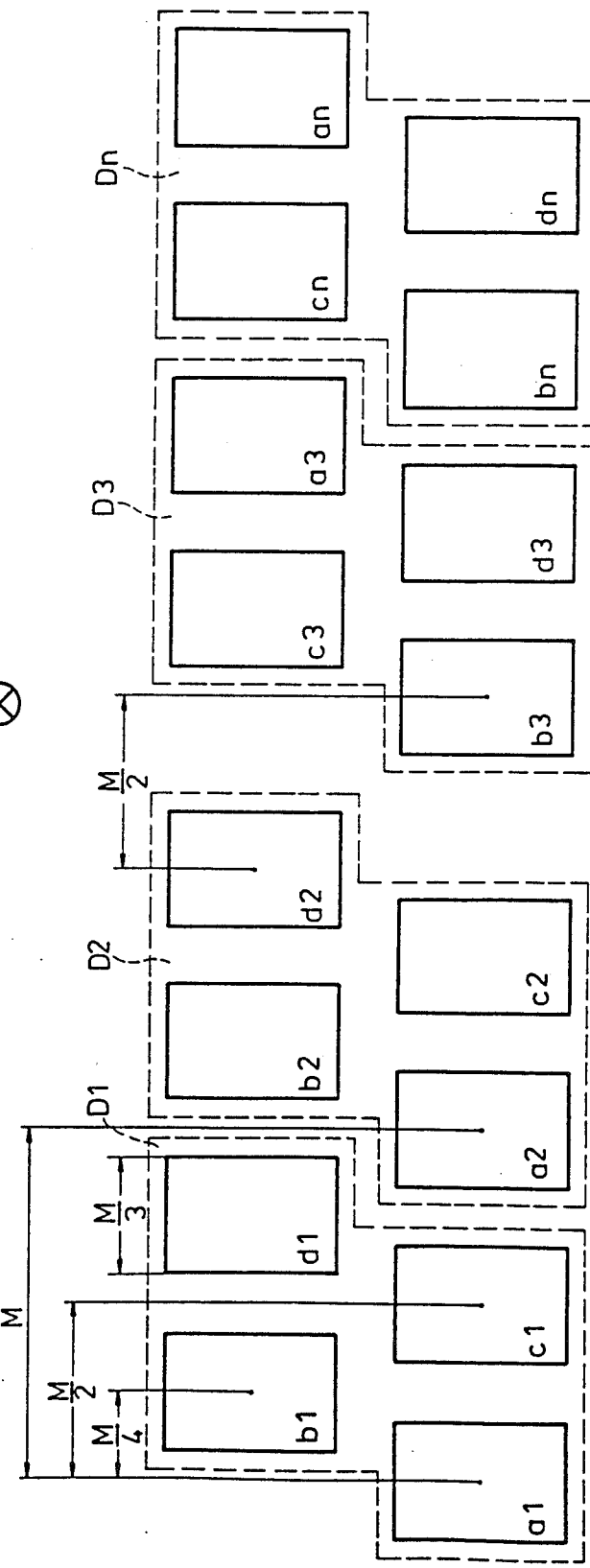
FIG. 2 depicts one embodiment of the detector system of the present invention.

FIG. 2 depicts one embodiment of the detector system of the present invention, showing the arrangement of photoelements within the series 5 and 6 of FIG. 1. The distance between the middle or center of the photoelements is M/2, while the distance between the middle of a photoelement from one series to the middle of a photoelement of the other series is M/4. Thus, as shown in FIG. 2, the photoelements a1, b1, c1, and d1 are phase displaced from one another through 90° with respect to the Moire period M. The photoelements therefore correspondingly generate scanning signals which are phase shifted from one another by 90°. An output signal S1 is generated by photoelements a1 and c1 while a corresponding output signal S2 is produced by photoelements b1 and d1. In other words, output signal S1 may be algebraically expressed as the sum of a signal Sa1 generated by photoelement a1 and a signal Sc1 generated by photoelement c1. Thus, $S1=Sa1+Sc1$. Similarly, $S2=Sb1+Sd1$. The signals may be circuited with one another in any manner commonly known in the art.

Signals S1 and S2 are two zero symmetry scanning signals phase shifted from one another by 90°. The photoelements a1, b1, c1, and d1 already form a complete scanning unit. Therefore, within the given frame, a harmonic free output signal will be generated if the photoelements a1, b1, c1, and d1 are arranged and sized such that the scanning signal is automatically subject to a Fourie analysis.

The calculation of Fourie coefficients and their relationship to a scanning signal and the elimination of harmonics are thoroughly explained in DE-OS No. 3239108 which is equivalent to U.S. Pat. No. 4,595,991 and in DE-PS No. 3412128 which is equivalent to U.S. Pat. No. 4,602,436. The teachings contained in these references are incorporated herein.

Thus, in accordance with the present invention, output signal S1 will contain only the fundamental wave $\sin \phi$. As a result of the photoelement arrangement and sizing depicted in FIG. 2, the second and third harmonics $\sin 2\phi$, $\cos 2\phi$ and $\sin 3\phi$ $\cos 3\phi$ are eliminated. The same is true for signal S2.

Thus, for the individual partial fields, a1, c1 ... an, cn, in order to eliminate the second harmonic, the distance between the field middles must equal one half the Moire period M. In order to eliminate the third harmonic, the width of a partial field a1, c1 ... an, cn must be equal to one third of the Moire period M. The same is true for signal S2 generated from partial fields b1, d1 ... bn, dn.

In FIG. 2, several detector systems D1 ... Dn are shown each consisting of four photoelements a1, b1, c1, d1; a2, b2, c2, d2; etc. The detector groups are arranged at a spacing M, 2M, etc. As a result, an additional signal pair is generated which upon error free graduation 3A, 4A, is identical with signals S1 and S2 and therefore may be switched in parallel.

In order to prevent the phase angle between a1, c1 and b1, d1, etc. and thus between signals S1 and S2 from changing as a result of angular movement about an axis perpendicular to the graduation plane, it is preferable to exchange the photoelement arrangement at least once. Thus, for example, photoelements a3, c3 may be exchanged to lie in the same row as photoelements b1, d1 and photoelements b3, d3 may be exchanged to lie in the same row as photoelements a1, c1.

Figure 3:
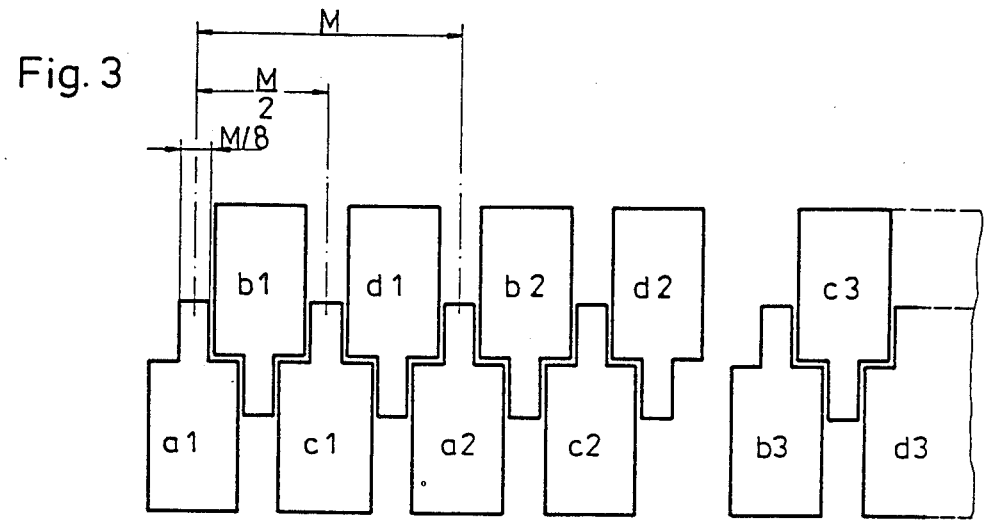
FIG. 3 depicts a second embodiment of the detector system of the present invention with interfitting partial fields.
Figure 4:
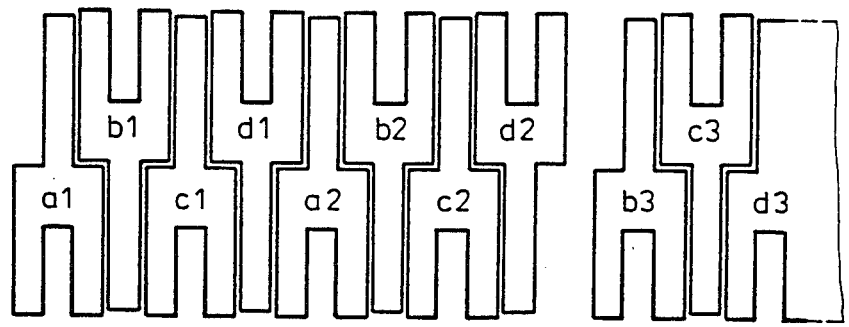
FIG. 4 depicts a further embodiment of the detector system of the present invention.
Figure 5:
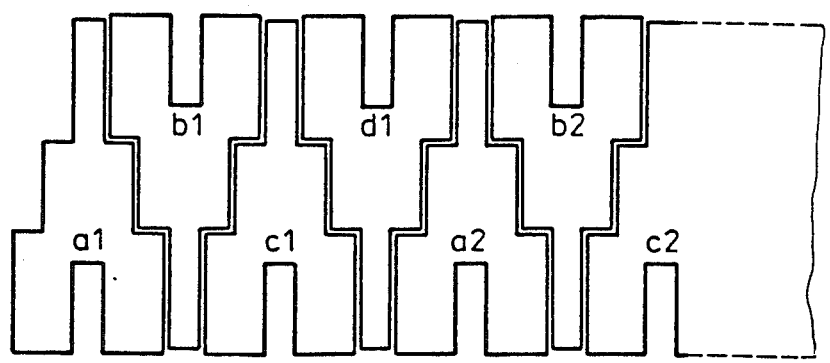
FIG. 5 depicts still another embodiment of the detector system of the present invention.

FIGS. 3, 4 and 5 illustrate further embodiments of the present invention wherein detector systems D1 ... Dn may be arranged such that the lengths of the partial fields of the photoelements may be varied in accordance with the cosine of the phase angle.

Referring to the embodiment depicted in FIG. 3, it can be seen that in accordance with the present invention, four harmonics can be eliminated. FIG. 4 illustrates an especially preferred arrangement of photoelements a1, b1, c1, d1, etc. within the detector system whereby the system is less sensitive to variations of the phase angle between the output signals.

FIG. 5 illustrates a further embodiment of an arrangement of interfitting photoelements a1, b1, c1, d1, etc. wherein six harmonics may be eliminated. In accordance with the present invention, for the elimination of six harmonics, twelve partial fields are provided at a spacing of $M/12 = 360°/12 = 30°$.

Figure 6:
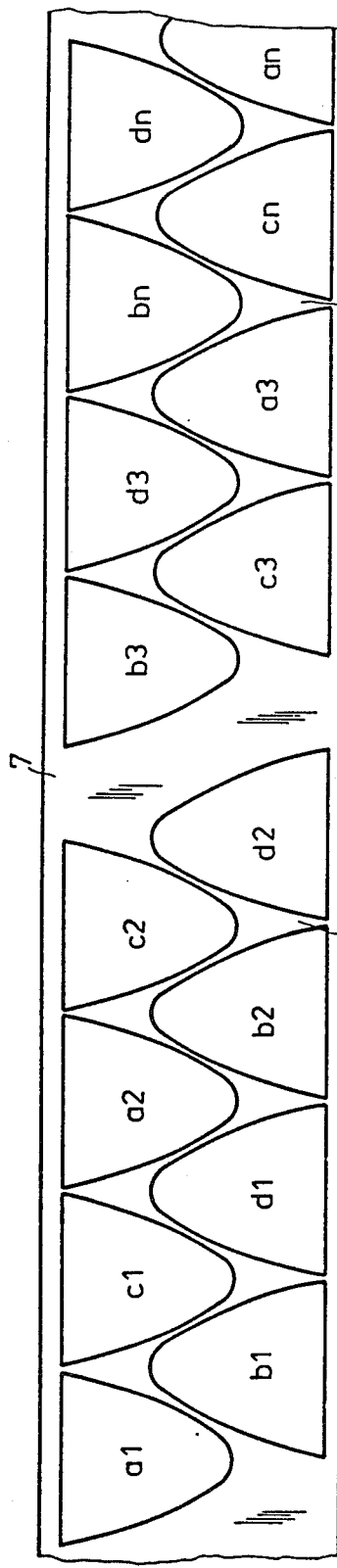
FIG. 6 depicts a detector system embodiment of the present invention having sinusoidal partial fields.

Thus, in accordance with the present invention, 12, 24, etc. harmonics can be eliminated by a step form approximation which gradually approaches a sinusoidal field contour. Such a sinusoidal field contour is illustrated in FIG. 6. Preferably, the partial fields a1 ... dn are integrated on a silicon carrier 7. The same is true for the arrangement depicted in FIG. 7 wherein the pratial fields a1 ... dn are interfitted as well as possible with one another. By the term interfit, it is intended to mean a close fitting arrangement of photoelements wherein the photoelements do not necessarily abut or engage one another. It is to be understood, however, that the photoelements may abut one another if desired. In the cases illustrated in FIGS. 6 and 7, the field widths are equal to half the Moire period M, while the partial fields and therefore the photoelements, are insulated from one another by narrow, undoped zones 8 which are inert.

Figure 7:
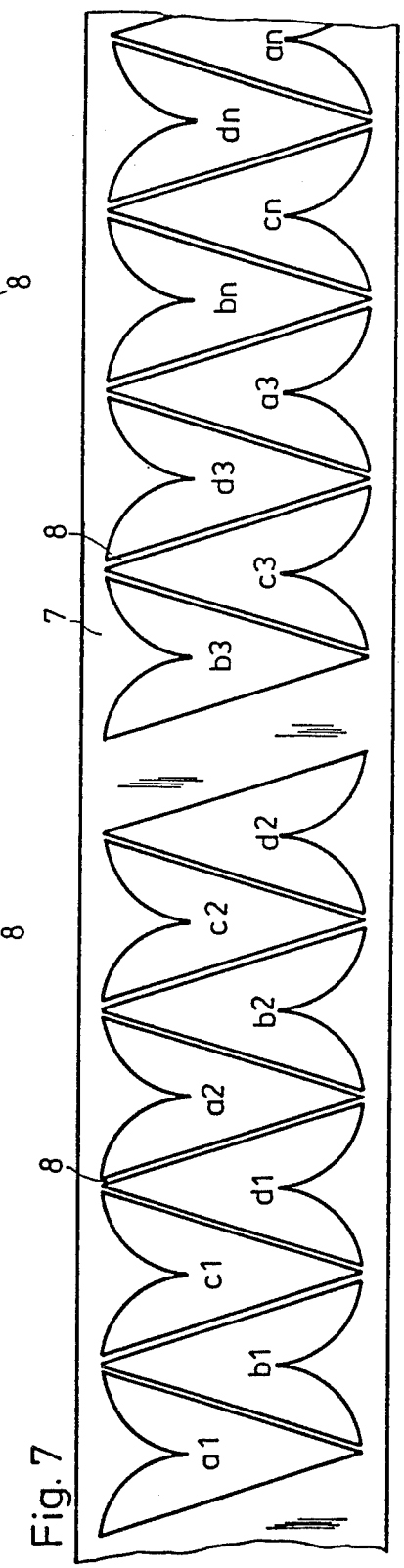
FIG. 7 depicts a further embodiment of the detector system of the present invention having enclosed partial fields of sinusoidal field contour.

One skilled in the art will readily recognize as a result of the elimination of the second and third harmonic components according to the embodiment illustrated in FIG. 2, and the elimination for all harmonic components according to the embodiments illustrated in FIGS. 6 and 7, photoelectric measuring systems can be constructed to eliminate any arbitrary number of harmonics by arranging selectively shaped photoelements in a precise manner as illustrated in FIGS. 3–5.

Figure 8:
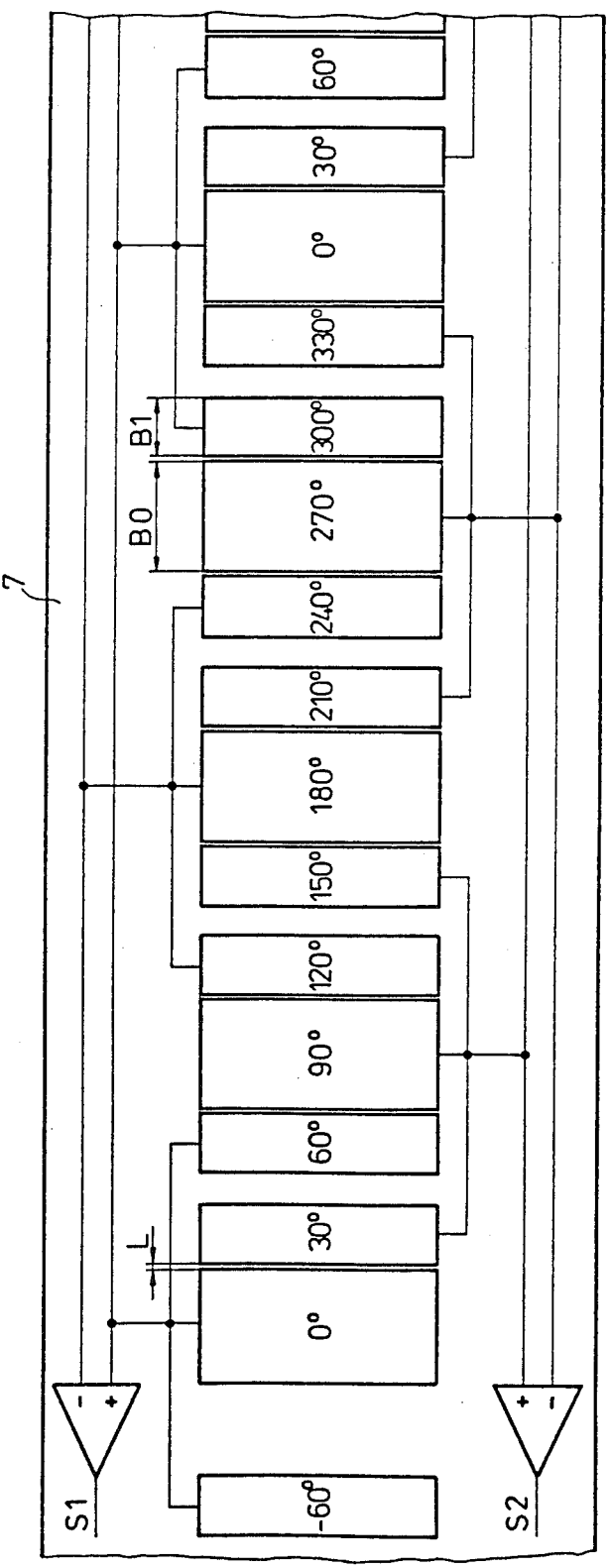
FIG. 8 depicts a schematic representation of a detector system of the present invention with partial fields arranged in series.

FIG. 8 depicts a further arrangement for generating harmonic free signals wherein the photoelements are arranged in a series or row. From this arrangement it is possible to employ a cylindrical lens (not shown) between scanning plate 3 and the photoelements. This arrangement provides for scanning a large area of the measuring scale thereby contributing to accuracy, while requiring only a small area of photoelements. Thus, high scanning frequencies may be advantageously employed at low cost.

The single row arrangement of photoelements illustrated in FIG. 8 may be employed to remove three harmonics. It is to be understood, however, that similar single row arrangements may be employed to eliminate any number of harmonics arbitrarily chosen in accordance with the present invention. In any event, with regard to FIG. 8, the elimination of three harmonis requires six scanning signals which are phase shifted from one another in each case by 60°. The amplitude of the scanning signal is varied with respect to the cosine of the phase angle of the fundamental wave by correspondingly sizing the width of the photoelements. Furthermore, the width of the photoelements is selected such that the photoelements which form the scanning places for the generation of signals S1 and S2 can be arranged in a continual row with the spacings between the individual photoelements being minimized.

In FIG. 8, the signal S1 is generated from two groups of photoelements which are circuited against one another. The first group consists of the photoelement 0° having a width B0 equal to 36° and two photoelements −60° (equal to 300°) and +60° having a width B1. Accordingly the following relationship exists:

$$\sin B0/\sin B1 = \cos 0/\cos 60° = \tfrac{1}{2}$$

By resolving this equation, it can be seen that B1 is equal to 17.1°.

The second group of the S1 signal contains the photoelement 180° having a width B0 and two photoelements 120° and 240° having a width B1.

Similarly, the signal S2 is generated from the six photoelements 30°, 90°, 150°, and 210°, 270° and 330°.

The distance between the photoelement 0° and 30°, L, as well as between the photoelements 60° and 90°, etc. is in this case, equal to 3.45°.

The graduation periods of the scanning unit and the graduation periods of the measuring scale are chosen such that over the entire parallel illuminated field of the scanning arrangement, several Moire periods will appear. As shown in FIG. 8, a set of $2 \times 6 = 12$ photoelements are provided per Moire period which are preferably incorporated into a single silicon carrier. Thus, in accordance with the present invention, if four Moire periods are to be detected, then $2 \times 6 \times 4 = 48$ photoelements are required.

The electric circuitry to be employed with the present invention can be seen from FIG. 8. Those skilled in the art will readily recognize that similar circuitry can be employed for the removal of additional harmonic components. Preferably, the circuitry can be deposited on a semiconductor or be applied to the carrier plate in a position adjacent to the photoelements.

It is to be understood that a wide range of changes and modifications to the preferred embodiment described above will be apparent to those skilled in the art. It is therefore intended that the foregoing detailed description with respect to the particular embodiments be regarded as illustrative rather than limiting, and that it be understood that it is the following claims including all equivalents which are intended to define the spirit and scope of this invention.

I claim:

1. In a photoelectric measuring device for obtaining harmonic free signals up to a predetermined bandwidth said system comprising a measuring scale and a scanning unit wherein the period P of said measuring scale and the period P′ of said scanning unit sufficiently differ in a scanning direction such that upon scanning a Moire oscillation pattern having a period M is produced, said Moire period M being greater than the graduation periods P and P′ of said measuring scale and said scanning unit respectively, said Moire oscillation being detected and converted into a periodic electric output signal (S1, S2) by a detector system comprising a plurality of photoelements, each photoelement generating an electric output signal, said photoelements being arranged to receive and convert said Moire oscillation into said periodic electric output signal, the improvement which comprises, said device comprises a plurality of detector systems (D1 . . . Dn), wherein each detector system comprises a plurality of photoelements (a1, b1, c1, d1, . . . an, bn, cn, dn) having a size, shape and position according to a Fourier analysis such that harmonics are optically eliminated from said periodic output signal of said detector system upon summing the output signal from said photoelements comprising said detector system.

2. The photoelectric measuring system of claim 1 wherein the spacing between the individual detector systems (D1 . . . Dn) is a whole numbered multiple of the period length M of the Moire pattern.

3. The photoelectric measuring system of claim 1 wherein the photoelements (a1 . . . dn) of said detector systems (D1 . . . Dn) interfit with one another upon a carrier.

4. The photoelectric measuring systems of claim 3 wherein said photoelements (a1 . . . dn) interfit to form a sinusoidal field contour.

5. The photoelectric measuring system of claim 3 wherein said photoelements (a1 . . . dn) comprise tongue-like sections which interfit with one another.

6. The photoelectric measuring system of claim 1 wherein said photoelements (a1 . . . dn) are supported on a silicon carrier.

7. The photoelectric measuring system of claim 6 further comprising means for insulating said photoelements (a1 . . . dn) from one another.

8. The photoelectric measuring system of claim 6 further comprising means for circuiting said photoelements (a1 . . . dn) on said silicon carrier.

* * * * *

UNITED STATES PATENT AND TRADEMARK OFFICE
CERTIFICATE OF CORRECTION

PATENT NO. : 4,782,229

DATED : November 1, 1988

INVENTOR(S) : Alfons Ernst

It is certified that error appears in the above-identified patent and that said Letters Patent is hereby corrected as shown below:

On the cover page in the title of the invention, please delete "FOR OBTAINING HARMONIC FREE SIGNALS".

IN THE DETAILED DESCRIPTION OF THE
DRAWINGS AND PREFERRED EMBODIMENTS

In column 3, line 30, please delete "Fourie" and substitute therefor --Fourier--.

In column 4, line 22, please delete "pratial" and substitute therefor --partial--.

In column 4, line 58, please delete "harmonis" and substitute therefor --harmonics--.

Signed and Sealed this

Third Day of September, 1991

Attest:

HARRY F. MANBECK, JR.

Attesting Officer      Commissioner of Patents and Trademarks